United States Patent
Wontner et al.

[11] Patent Number: 5,911,645
[45] Date of Patent: Jun. 15, 1999

[54] PROCESS FOR OPERATING A STEPLESS DRIVE UNIT CONSISTING OF AN INTERNAL COMBUSTION ENGINE AND A POWER BRANCHING TRANSMISSION

[75] Inventors: Gebhard Wontner, Wolfern; Peter Ulbrich, Behamberg, both of Austria

[73] Assignee: Steyr-Daimler-Puch Aktiengesellschaft, Vienna, Austria

[21] Appl. No.: 08/981,857

[22] PCT Filed: Jul. 16, 1996

[86] PCT No.: PCT/AT96/00124

§ 371 Date: Jan. 5, 1997

§ 102(e) Date: Jan. 5, 1997

[87] PCT Pub. No.: WO97/03857

PCT Pub. Date: Feb. 6, 1997

[30] Foreign Application Priority Data

Jul. 24, 1995 [DE] Germany .......................... 195 27 015

[51] Int. Cl.⁶ .................................................. B60K 41/12
[52] U.S. Cl. ................................................................ 477/69
[58] Field of Search ............................... 477/69, 128, 129

[56] References Cited

U.S. PATENT DOCUMENTS

| | | | |
|---|---|---|---|
| 4,082,013 | 4/1978 | Dornfeld et al. | 477/69 |
| 4,170,153 | 10/1979 | Mizuno et al. | 477/69 |
| 4,368,653 | 1/1983 | Mizuno et al. | 477/69 |
| 4,776,233 | 10/1988 | Kita et al. | 477/69 |
| 5,135,443 | 8/1992 | Paton et al. | |
| 5,146,812 | 9/1992 | Nikolaus et al. | |
| 5,682,315 | 10/1997 | Coutant et al. | 477/69 |
| 5,809,846 | 9/1998 | Ohkura et al. | 477/69 |

Primary Examiner—Dirk Wright
Attorney, Agent, or Firm—Bachman & LaPointe, P.C.

[57] ABSTRACT

A drive unit is composed of an internal combustion engine (1) and of a continuously controllable division gear which comprises a continuously controllable hydrostatic engine/pump unit (4) and a summator gear (10) with subsequent range gears (12, 13) for successive stepup ranges. In order to make this drive unit also possible at operating points within an interval containing the shift points, first the hydrostatic unit (4) is controlled further as far as the shift point, while the engine speed continues to remain constant, the clutch assigned to the next range is then closed and the desired vehicle speed is set by changing the engine speed and is maintained.

4 Claims, 5 Drawing Sheets

| RANGE \ CLUTCH | KV | KR | K1 | K2 | K3 | K4 |
|---|---|---|---|---|---|---|
| R2 |  | X |  | X |  |  |
| R1 |  | X | X |  |  |  |
| V1 | X |  | X |  |  |  |
| V2 | X |  |  | X |  |  |
| V3 |  |  |  | X | X |  |
| V4 |  |  |  | X |  | X |
| V1* |  |  | X |  |  | X |
| V4 |  |  |  | X |  | X |

FIG. 2

PROCESS FOR OPERATING A STEPLESS DRIVE UNIT CONSISTING OF AN INTERNAL COMBUSTION ENGINE AND A POWER BRANCHING TRANSMISSION

The invention is concerned with a method for operating a drive unit which is composed of an internal combustion engine and of a continuously variable power-split gear and the gear of which is composed of a continuously controllable hydrostatic engine/pump unit and of a summator gear with range gears for successive stepup ranges, the changeover from one range to the next taking place at a predetermined shift point by the closing of the positive clutch assigned to the next range and, subsequently, the opening of the positive clutch assigned to the preceding range.

A power-split of the type mentioned and a method of this type are known from DE-A 41 04 167. In this gear, during acceleration the hydrostatic unit is first controlled in a first range from a nominal speed in one direction of rotation to the nominal speed in the opposite direction of rotation. In the summator gear, the rotation of this hydrostatic branch is superposed on the mechanical branch and is brought to the output speed in a downstream range gear. In order to continue acceleration, a changeover is made from the first to the second of various members of the range gear at a predetermined shift point, at which the output speeds of these members are identical. In this second range, the hydrostatic unit is controlled back again to the nominal speed in the initial direction of rotation. This can then be followed by further ranges. It is thus possible, at a constant engine speed, to accelerate to a selected vehicle speed by adjusting the hydrostatic unit, with the result that the engine is always operated at the most favorable operating point of its characteristic map.

However, when the shift method specified is used for a working machine, a problem arises when an operating point is selected at the boundary between two ranges, that is to say in the vicinity of the shift point. Small load fluctuations may then lead to repeated upshifts and downshifts. To solve this problem, DE-A 41 04 167 proposes simply not opening the clutch of the preceding range, so that the stepup-ratio is retained at the shift point. That is, in effect, a shift block.

For this purpose, it proposes a hysteresis device activated by a signal which results from a specific time variable and/or a difference of the load variable and/or as a function of an operating variable.

It is known from EP-A 429,503 to provide shift suppression in the region of the shift points. In this case, if the range limit is exceeded, the stepup is kept constant from this point and the rotational speed of the engine is varied. In order to keep the stepup constant, however, the hydrostatic unit would have to be retained exactly in its instantaneous position, which is not possible on account of its hydraulic control. The unavoidable fluctuations, for example due to a change in the hydrostatic slip in the event of load fluctuations, could nevertheless lead to unintended range shifting. Moreover, such fluctuations also impair the regulation of the engine speed.

When an operating point near the upper range limit is to be approached, a considerable increase in the engine speed is necessary, thus increasing the wear of the engine and reducing the efficiency. Finally, at the moment when the range limit is exceeded, it is not yet possible to establish whether the range is merely to be passed or whether an operating point in the range has been selected for a longer time. The driver may, of course, change his mind at any time and actuate the accelerator lever. If, for example, he discontinues acceleration in order to select an operating point within the range limits, shift suppression is put out of action. If he wishes to accelerate from an operating point within the range limits, the engine must do this at the increased speed which it reached at the upper range limit.

The object of the invention is therefore, to provide a generic method which makes it possible to operate a drive unit of the type described even at operating points in the vicinity of the shift points, at the same time ensuring reliable shift suppression, along with the least possible wear and fuel consumption.

This is achieved, according to the invention, by means of a method according to steps a) to e) of the first claim. All conceivable driving states can thereby be controlled by means of only three criteria (the reaching of the interval limit, the outward or inward exceeding of the latter and the reaching of the shift point): when an interval limit is exceeded from the outside inward (irrespective of whether it is the upper or the lower limit), this is merely recorded, but nothing happens yet. Only when the shift point is reached does the second clutch close and remain closed; only when an interval limit is exceeded outward does the respective clutch open. Operating points on the far side of the shift point are reached in this way.

However, if the desired operating point in the interval precedes the shift point, the exceeding of an interval limit from outside is once again merely recorded; if the operating point is subsequently left again, without the shift point being passed, nothing will have happened. However, if the shift point is reached at this operating point due to a slight load reduction (for example, change in gradient of the road), the second clutch closes and remains closed until one of the interval limits is exceeded outward again.

Thus, all possible operating points within the interval (corresponding to the range) are approached either from the shift point (synchronous point) (when they are located on the far side of this) or without any special measures (if they precede this). In the latter case, action is taken only later when a load change leads to the initiation of shifting. The case distinction thus results in measures at different time points.

All this affords further decisive advantages:

1) The operating point is approached from the middle of the interval by raising or lowering the speed, the speed increase therefore being at most half as great. This is also true when reacceleration or further acceleration is to take place from the operating point.

2) During control via the engine speed, the stepup is retained positively and exactly at the shift point (synchronous point) by means of the two engaged clutches. There are therefore no fluctuations which are caused by the control of the hydrostatic unit and which could lead to unintended range shifting or to an impairment in the regulation of the engine speed.

3) As long as both clutches are engaged, the hydrostatic unit is essentially loadless, this being beneficial to its useful life, the efficiency of the gear as a whole and slip correction prior to the release of the respective range clutch when the operating point is left.

4) Since the exceeding of an interval limit is initially merely recorded, but, alone, still does not lead to any action, the decision as to whether this signifies a through acceleration or the approach of an operating point in the interval has to be taken only at the latest possible time point when the shift point is reached. Thus, a sudden change of mind of the driver or unintended actuation of the accelerator pedal also cannot lead to unintended range shifting.

5) Interval limits may be placed very near to the shift point, because, after it has been exceeded inward, nothing initially happens.

In a further embodiment of the invention, the interval limits may even be asymmetric with respect to the shift point and be defined differently for outward and inward exceeding (claim 2), since, by virtue of the special effect of the method according to the invention, the inward interval limit can be located very near to the shift point (claim 3). This affords the advantage that, when an operating point in the interval is left, the deflection in the regulation of the engine speed is further reduced. As a result, the engine moves away to a lesser extent from the speed of highest efficiency. This further improves the overall efficiency of the drive unit.

Finally, it is within the scope of the invention for the hydrostatic unit to be shifted to loadless, as soon as the clutch assigned to the next range is closed, and for the hydrostatic unit to be put under load again only before the clutch assigned to the preceding range is opened (claim 4). The losses in the hydrostatic unit while control is being carried out by varying the engine speed are thereby markedly reduced. In this case, of course, both clutches are closed and force transmission takes place solely via the mechanical branch.

The invention is described and explained below with reference to figures of which:

FIG. 2 shows a clutch shift diagram for the gear of FIG. 1,

Figure 1:
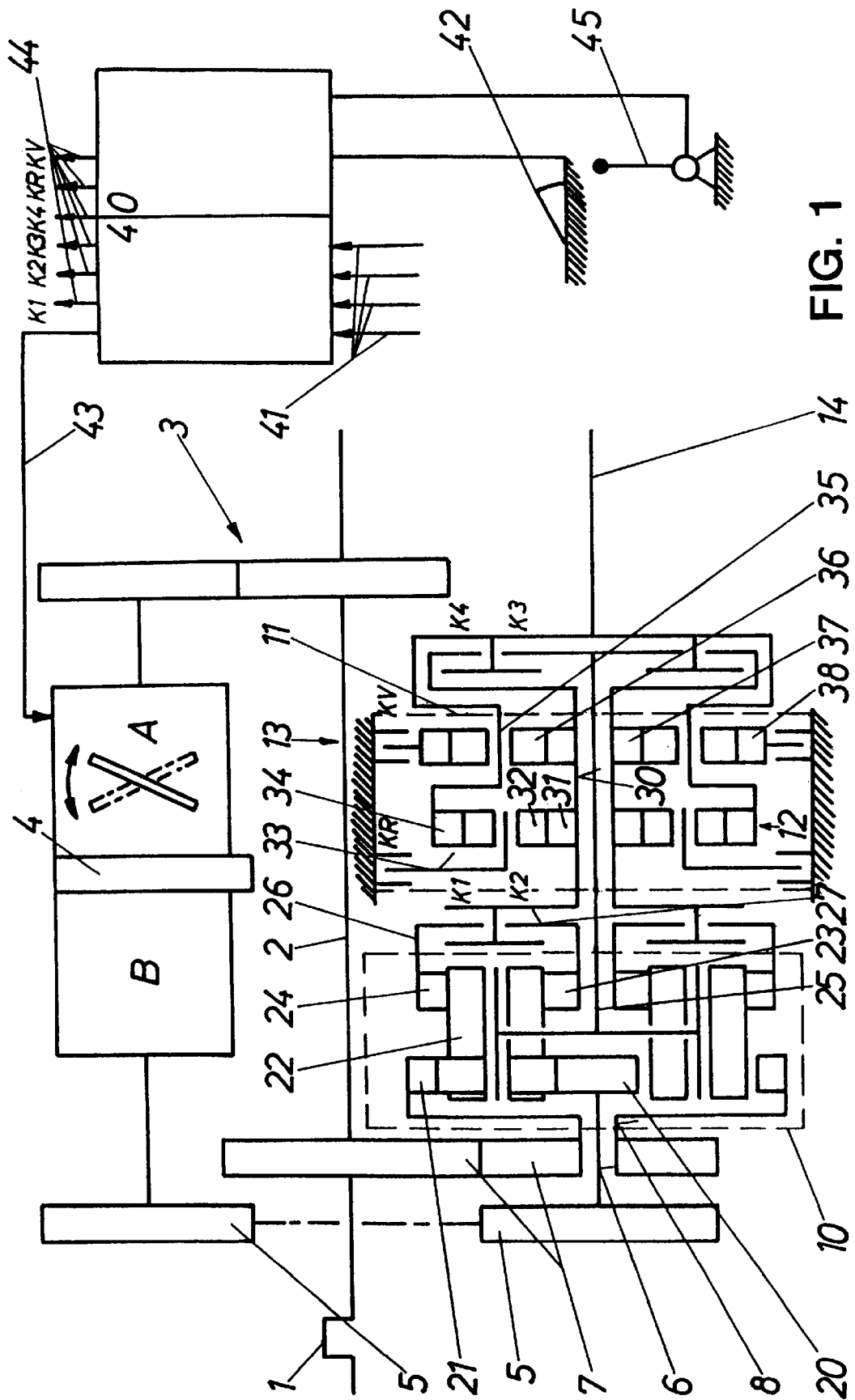
FIG. 1 shows a gear diagram in an advantageous embodiment.

In FIG. 1, the engine 1, for example an internal combustion engine, is merely indicated. It drives, without the intermediate clutch, a gear input shaft 2. The latter, on the one hand, drives via a first gearwheel transmission 3 a controllable hydrostatic unit 4, the output of which drives a first input shaft 6 via a second gearwheel transmission 5. On the other hand, the gear input shaft 2 drives a second input shaft 8 via a third gearwheel transmission 7. The hydrostatic unit 4 is composed of two hydrostatic machines A, B, of which one always works as a motor and one as a pump. The machine A can be controlled continuously in both directions of rotation.

The two input shafts 6, 8 are part of a summator planetary gear 10, from which is driven, via clutches K1, K2, a multistep gear 11 which is composed, here, of a first planetary gear step 12 with a clutch KR and of a second planetary gear step 13 with a clutch KV. An output shaft 14, which serves, for example, for driving a vehicle, is connected via clutches K3, K4.

The summator planetary gear 10 contains a first sun wheel 20, a first ring gear 21 and stepped planet wheels 22 which form the first planetary train. The second planetary train is composed of a second sun wheel 23, a ring gear 24 and the stepped planet wheels 22 which are common to both trains. The planet wheels 22 are mounted on a planet carrier, the shaft 25 of which represents the first output shaft of the summator planetary gear 10. The second ring gear 24 acts on the clutch K1 via a ring gear shaft 26 and represents the second output shaft. The second sun wheel 23 acts on the clutch K2 via a sun wheel shaft 27 and represents the third output shaft of the summator planetary gear 10.

The first step 12 of the multistep gear 11 is composed of a first sun wheel 31, first planet wheels 32, a first planet carrier 33 and a first ring gear 34. The sun wheel shaft 30 is driven selectively by one of the two clutches K1, K2, and the first planet carrier 33 can be braked on the stationary housing by means of the clutch KR. The first ring gear 34 is connected fixedly in terms of rotation to a second planet carrier 35 of the second planetary gear step 13. Its planet wheels 36 mesh internally with a second sun wheel 37, which is connected fixedly in terms of rotation to the sun wheel shaft 30, and externally with a second ring gear 38, which can be braked on the housing via the clutch KV. The output shaft 14 is connected fixedly in terms of rotation to the second planet carrier 35 and can be connected fixedly in terms of rotation via the clutches K3, K4 either to the planet carrier shaft 25 or to the sun wheel shaft 30.

Furthermore, a control unit 40 is indicated. This receives measured operating and driving parameters via signal lines 41 and a load or vehicle speed presetting from an accelerator pedal 42. From these signals, the control unit 40 forms control signals for the hydrostatic unit 4, which are transmitted to the latter via the control line 43, and control signals 44 for the clutches K1, K2, K3, K4, KR, KV. Finally, a preselector switch 45 is also provided, which the driver actuates in order to select the other shift strategy over the further range.

FIG. 2 shows, in table form, which clutches are closed in the individual driving ranges, the closed state being indicated by an X in the respective row and column. In the gear chosen as an example, two reverse ranges R1, R2 and four forward ranges V1, V2, V3 and V4 are provided. The first six rows correspond to the normal ranges, and in the seventh row the range V1* is the further range which bridges the ranges V1, V2 and V3. The subsequent normal range V4 appears in the last row. It can be seen that, here too, the changeover takes place as a result of the opening of the clutch K1 and the closing of the clutch K2.

Figure 3:
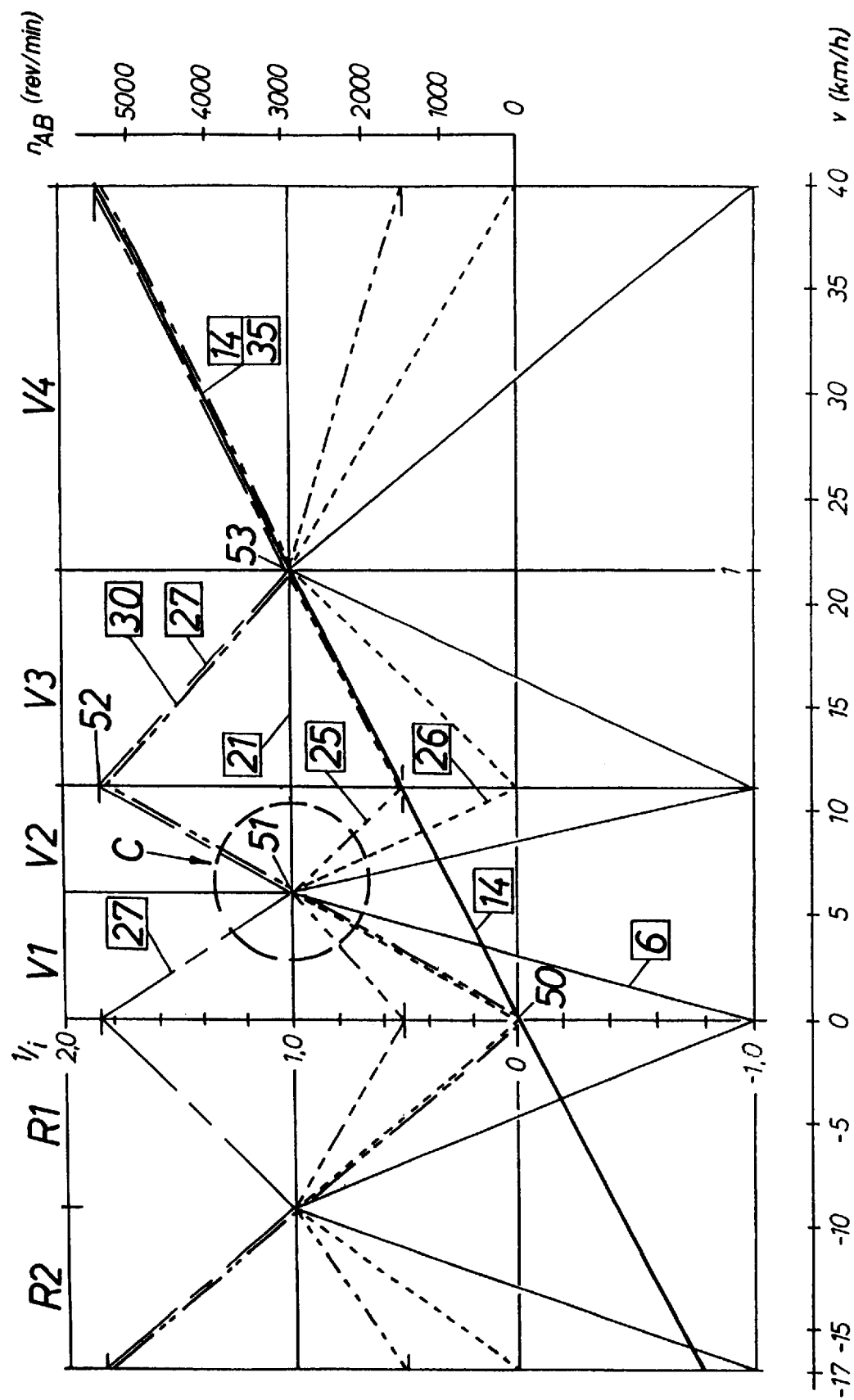
FIG. 3 shows an engine speed diagram for the gear of FIG. 1 in the normal ranges.

The normal sequence of range shifts is now described by means of the vehicle speed diagram of FIG. 3 with reference to FIGS. 1 and 2. The vehicle speed is plotted on the abscissa and the engine speeds are plotted on the ordinate at the right-hand edge of the figure. The regulating positions of the hydrostatic unit 4 which are less relevant here are plotted on the abscissa corresponding to the vehicle speed 0. The ranges corresponding to FIG. 2 are entered along the horizontal top edge of the figure, the range limits by means of a vertical line. In the first driving range V1, the clutches K1 and KV are closed. The drive is via the ring gear shaft 26 and the second planetary gear step 13. In this range, the hydrostatic unit 4 and therefore also the rotational speed of the first input shaft 6 will run through from −1 to +1. In this case, the sun wheel shaft 30 is run up from the vehicle speed 0 at the starting point 50 to the first synchronous point 51 at which the second range V2 commences. At this point, the rotational speeds of the ring gear shaft 26 and sun wheel shaft 27 are identical, the clutch K2 is closed and the clutch K1 is opened. The hydrostatic unit 4 and, with it, the first input shaft 6 then run through their speed range in the opposite direction from +1 to −1. At this point 52, the clutch K3 is closed and the clutch KV is opened. The third range V3 is run through until the second synchronous point 53 is reached. Since, at this, the planet carrier shaft 25 and the sun wheel shaft 30 rotate at the same speed, the clutches can be changed over. So far this is the course of action during normal range shifts.

Figure 4:
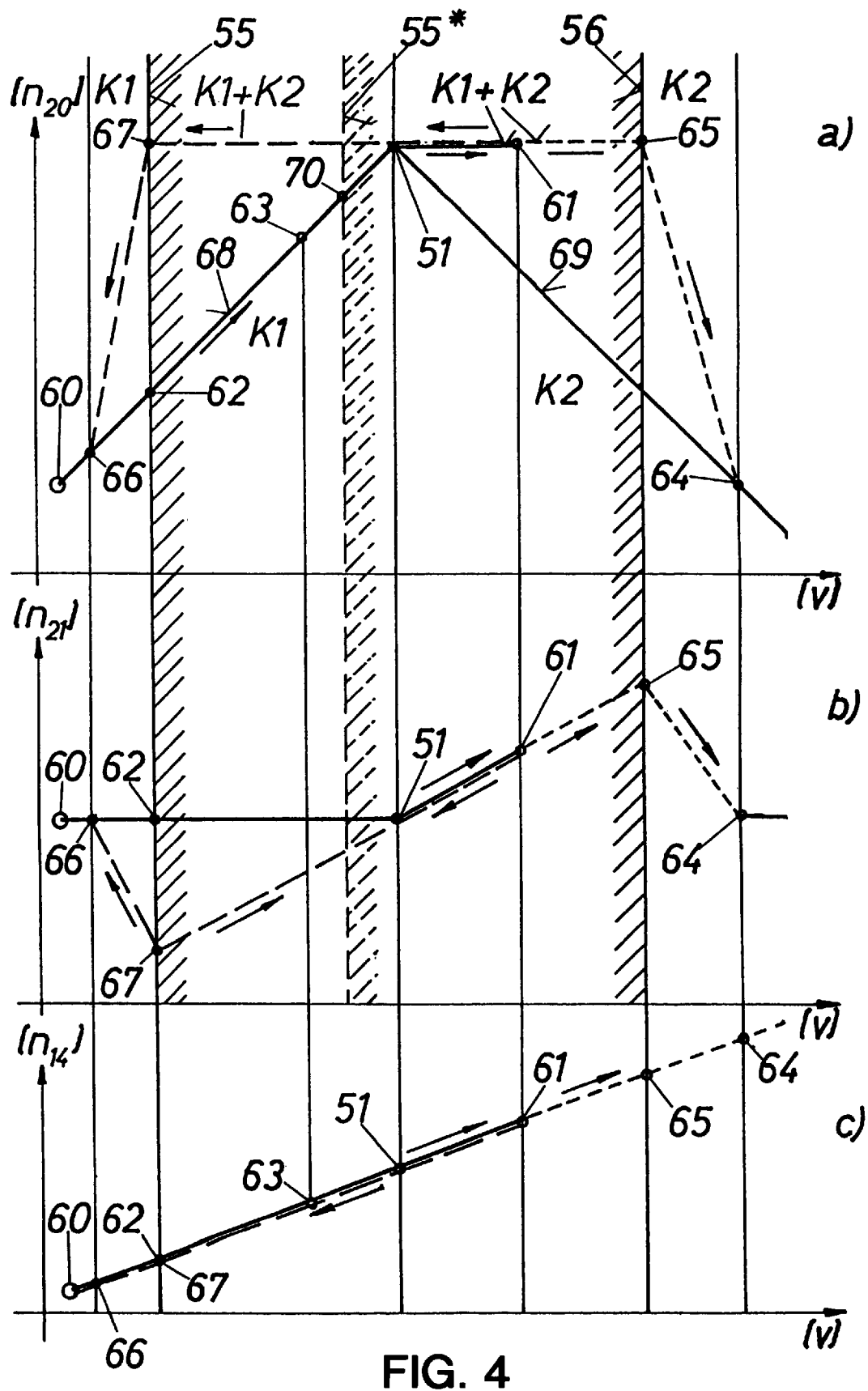
FIG. 4 shows an enlarged detail A from the engine speed diagram of FIG. 3 in a group of operating states.

FIG. 4 illustrates, greatly enlarged, the vicinity of the shift point 51 (detail C in FIG. 3). Moreover, the various lines of the vehicle speed diagram are drawn apart from one another, thus giving rise to FIGS. 4a, 4b and 4c. In all three, the vehicle speed v is indicated on the ordinate and the respective rotational speed n is indicated on the abscissa, specifically, in FIG. 4a), the rotational speed of the hydrostatic unit (n 20), in FIG. 4b), the rotational speed of the internal combustion engine (n 21) and, in FIG. 4c), the rotational speed of the output shaft (n 14). The limits of the defined interval containing the shift point 51 are hatched inward and are designed by 55 (lower interval limit) and 56 (upper interval limit).

Now if, starting from an instantaneous operating point 60 which is located outside the interval and at a relatively low vehicle speed, the driver selects a target operating point 61 which is located within the interval and on the far side of the shift point 51, the control recognizes this by comparison and remembers it. Then, by adjusting the hydrostatic unit (FIG. 4a), while ensuring a constant engine speed (FIG. 4b), control goes as far as the lower interval limit 55. The exceeding of the lower interval limit 55 is also recorded and noted, but there is further control via the hydrostatic unit until the shift point 51 is reached, only the clutch K1 being closed in the shift range V1. When the shift point 51 is reached, the clutch K2 is then also closed, as would be the case during a normal runthrough to a target point outside the interval. However, since the control knows that an operating point 61 within the interval is to be approached, and since it also knows that the interval limit 55 has already been exceeded, the clutch K1 is not opened and control is carried out by increasing the engine speed (from 51 to 61 in FIG. 4b). In this way, the operating point 61 is reached at a slightly increased engine speed and the vehicle can then be operated continuously at this operating point, without the fear of an undesirable range shift in the case of a negligible load change.

If, starting from the operating point 60 located outside the interval, an operating point 63 within the interval, but before the shift point 51, is selected, then, as in the previous case, the passing of the lower interval limit 55 at the point 62 is recorded and the operating point 63 is approached in an entirely conventional way by adjusting the hydrostatic unit. Although it is now in the interval and just below the shift point, the control nevertheless acts in the same way as at any operating point outside the interval. However, if this operating point is displaced in the course of further operation as a result of external circumstances (for example, a change in tractive resistance) and, at the same time, reaches the shift point 51, this shift then takes place as explained further above. That is to say, both clutches remain closed, until one of the two interval limits 55, 56 is exceeded from the inside outward. They therefore remain closed even when any other operating point within the interval is to be approached.

Now if a new operating point located outside the interval is to be approached again from an operating point located inside the interval, there are two possibilities: either it is located on the same side of the vertical (represented by short dashes in the figures) which indicates the shift point 51 or it is located on the other side (represented by long dashes in the figures). The load point 64 is located on the same side, that is to say at a higher vehicle speed than the previous load point 61. Since it is not possible for both clutches K1, K2 to open within the interval and as long as the control is via the rotational speed of the engine, until the upper interval limit 56 is reached the engine speed n21 is controlled until the point 65 (FIGS. 4a, 4b) is reached. At this point, only the clutch K1 is opened and the hydrostatic control takes over again. According to FIG. 4b, then, the engine speed n21 is returned again from the increased level (65 in FIG. 4b) to the normal level at 64 (FIG. 4b). The control of the hydrostatic unit must then compensate not only for the acceleration from 65 to 64 in FIG. 4c), but also for the reduction in the engine speed from 65 to 64 in FIG. 4b). In the case of further acceleration beyond the point 64, control is once again carried out in a conventional way merely by adjusting the hydrostatic unit, while ensuring a constant engine speed n21 (FIG. 4b).

If, by contrast, an operating point 66 outside the lower interval limit 55 is to be approached from the operating point 61, this takes place as follows: (represented by long dashes). Since neither of the two clutches should be opened within the interval, action is taken by lowering the engine speed n21 from the point 61 to the point 67, with the clutches K1, K2 closed (consequently the horizontal dashed line in FIG. 4a) and the engine speed n21 (FIG. 4b) is lowered to the point 67. Only now is the clutch K2 disengaged, the engine speed n21 is increased again (from 67 to 66 in FIG. 4a) and the hydrostatic unit takes over the control (from 67 to 66 in FIG. 4b), said unit once again compensating the increase in the engine speed up to the target point 66.

However, if the operating point 66 is to be approached from the operating point 63, this takes place perfectly normally. Since the shift point has, of course, not yet been reached, neither of the clutches K1, K2 has yet been actuated nor has there been a changeover to the control of the engine speed. Although the control knows that, at 62, the lower range limit has been exceeded from the inside outward, it nevertheless "forgets" again that operation within the interval has taken place. If, thereupon, the operating point 64 outside is to be approached from the operating point 66, that is to say the interval merely has to be run through, this takes place in an entirely conventional manner along the lines 68, 69.

In FIG. 4, 55* also indicates that the lower interval limit 55 for passing from the outside inward can also be placed very near to the shift point 51.

Figure 5:
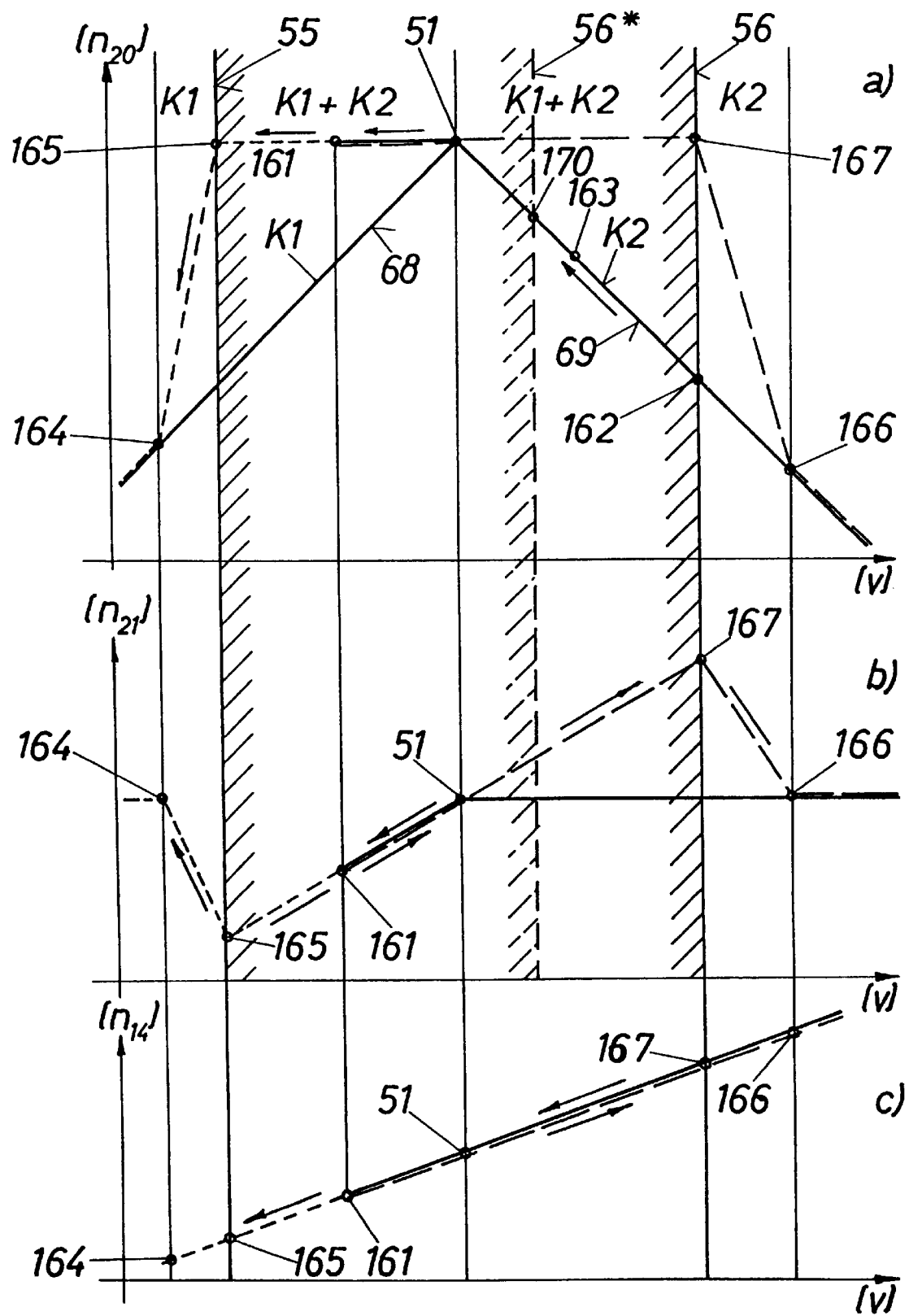
FIG. 5 shows an enlarged detail A from the engine speed diagram of FIG. 3 in another group of operating states.

FIG. 5 shows the same in principle, but for reaching an operating point within the interval limit 55, 56 from a vehicle speed which is above the interval, that is to say during deceleration. The designation of the points is also similar, being increased by 100.

We claim:

1. A method for operating a drive unit which is composed of an internal combustion engine and of a continuously variable power-split gear and the gear of which is composed of a continuously controllable hydrostatic engine/pump unit (4) and of a summator gear (10) with range gears (11, 12) for successive stepup ranges (V1 to Vn), the changeover from one range to the next taking place at a predetermined shift point (51, 52, 53) by the closing of the positive clutch (Kn) assigned to the next range and, as a result, the opening of the positive clutch (Kn−1) assigned to the preceding range, wherein, in the selection of a vehicle speed which, at a constant engine speed (n21), would be within a defined interval (55–56) containing the shift point (51; 52; 53), the following steps are adopted:

a) from the point where the limit of the interval (55–56) is reached from outside, the hydrostatic unit (4) is controlled further up to the shift point (51; 52; 53), while the engine speed (n21) continues to remain constant, b) when the shift point (51; 52; 53) is reached, the clutch (Kn) assigned to the next range (Vn) is closed, so that both clutches are then engaged, c) in this state, the desired vehicle speed is set by changing the engine speed (n21) and is maintained, d) when a vehicle speed located outside the interval (55–56) is selected once again, further control is carried out up to the interval limit (55; 56) by changing the engine speed, e) when this interval limit (55; 56) is reached from the inside, one of the two clutches (Kn−1; K1) is opened, the control of the hydrostatic unit (4) is triggered and the engine speed (n21) returns to the original constant value.

2. The method as claimed in claim 1, wherein the interval limits (**55, 55\*, 56, 56\*) are asymmetric with respect to the shift point (51, 52, 53**) and are defined differently for outward and inward exceeding.

3. The method as claimed in claim 2, wherein the interval limits for inward exceeding (**55\*, 56\*) are located very near to the shift point (51, 52, 53**).

4. The method as claimed in claim 1, wherein the hydrostatic unit (4) is shifted to loadless as soon as the clutch assigned to the next range is closed, and wherein the hydrostatic unit (4) is put under load again only before the clutch assigned to the preceding range is opened.

* * * * *